US012651206B2

(12) United States Patent
Jang et al.

(10) Patent No.: US 12,651,206 B2
(45) Date of Patent: Jun. 9, 2026

(54) METHOD, SYSTEM, AND NON-TRANSITORY COMPUTER-READABLE RECORDING MEDIUM FOR MANAGING MULTIPLE FEDERATED LEARNING MODELS MOUNTED ON DEVICES

(71) Applicant: LINE Plus Corporation, Seongnam-si (KR)

(72) Inventors: Hyukjae Jang, Seongnam-si (KR); Dong Soo Lee, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 733 days.

(21) Appl. No.: 17/939,204

(22) Filed: Sep. 7, 2022

(65) Prior Publication Data

US 2023/0075590 A1     Mar. 9, 2023

(30) Foreign Application Priority Data

Sep. 9, 2021   (KR) ........................ 10-2021-0120203

(51) Int. Cl.
*G06F 7/00* (2006.01)
*G06F 9/48* (2006.01)
*G06F 11/30* (2006.01)
*G06F 16/00* (2019.01)
*G06N 20/20* (2019.01)

(52) U.S. Cl.
CPC ........... *G06N 20/20* (2019.01); *G06F 9/4881* (2013.01); *G06F 11/3062* (2013.01)

(58) Field of Classification Search
None
See application file for complete search history.

(56) References Cited

U.S. PATENT DOCUMENTS

| | | | | |
|---|---|---|---|---|
| 2021/0390152 A1* | 12/2021 | Jang | ........................ | G06N 20/00 |
| 2022/0116764 A1* | 4/2022 | Pezeshki | ............... | H04W 72/20 |
| 2022/0245459 A1* | 8/2022 | Laskaridis | ............. | G06N 3/082 |
| 2022/0292392 A1* | 9/2022 | Anwar | ................ | G06F 16/2453 |
| 2022/0366320 A1* | 11/2022 | Liu | ....................... | G06N 3/0442 |

FOREIGN PATENT DOCUMENTS

| | | |
|---|---|---|
| JP | 2020-528589 A | 9/2020 |
| KR | 10-2019-0117837 A | 10/2019 |
| KR | 10-2020-0133484 A | 11/2020 |
| KR | 10-2021-0073145 A | 6/2021 |

OTHER PUBLICATIONS

Communication dated Jul. 23, 2024 from Korean Intellectual Property Office in Application No. 10-2021-0120203.
Communication dated Dec. 2, 2025, issued in Japanese Application No. 2022-135860.

* cited by examiner

*Primary Examiner* — Tuan A Pham
(74) *Attorney, Agent, or Firm* — Sughrue Mion, PLLC

(57) ABSTRACT

A method for managing a plurality of federated learning models incorporated to a device includes monitoring state information of the computer device to which a plurality of federated learning models is mounted; and performing learning scheduling on the plurality of federated learning models based on the state information and requirements for each model.

18 Claims, 8 Drawing Sheets

Figure 6:
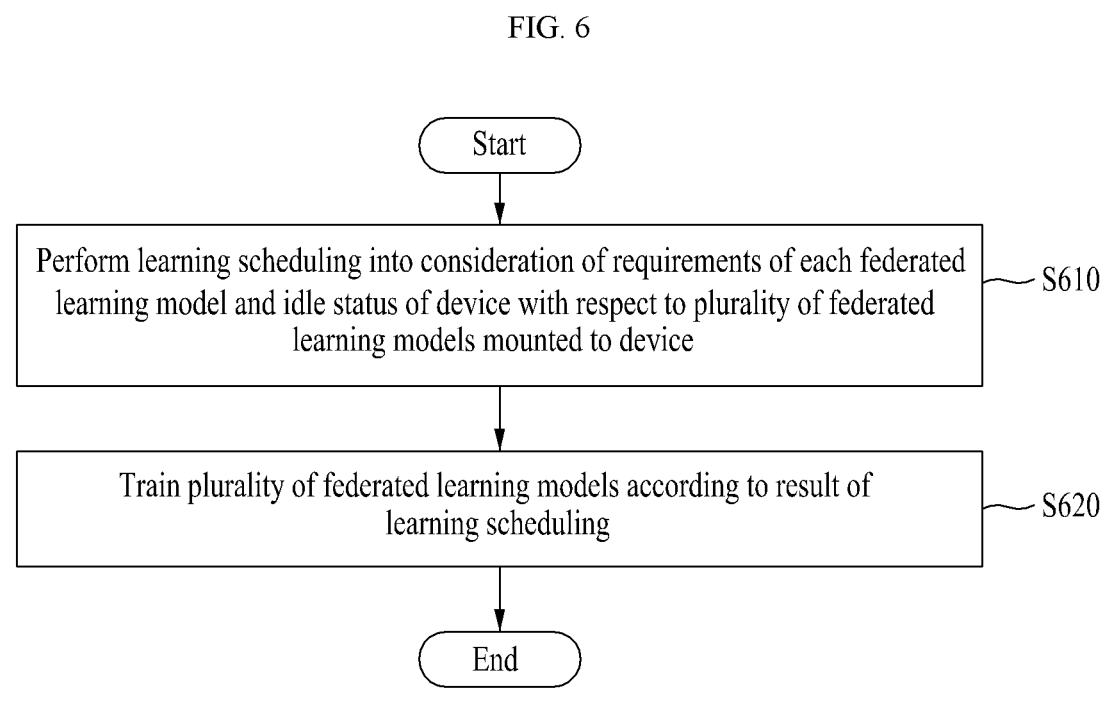

Start

Perform learning scheduling into consideration of requirements of each federated learning model and idle status of device with respect to plurality of federated learning models mounted to device ⟋ S610

Train plurality of federated learning models according to result of learning scheduling ⟋ S620

End

METHOD, SYSTEM, AND NON-TRANSITORY COMPUTER-READABLE RECORDING MEDIUM FOR MANAGING MULTIPLE FEDERATED LEARNING MODELS MOUNTED ON DEVICES

CROSS-REFERENCE TO RELATED APPLICATION(S)

This U.S. non-provisional application claims the benefit of priority under 35 U.S.C. § 119 to Korean Patent Application No. 10-2021-0120203, filed Sep. 9, 2021 in the Korean Intellectual Property Office (KIPO), the disclosure of which is incorporated herein by reference in its entirety.

BACKGROUND

1. Field

Example embodiments of the following description relate to technology for managing a federated learning model.

2. Description of Related Art

A neural network may be integrated into an application deployed on a multitude of distributed edge devices (e.g., processors or computing devices implemented in hospitals or cellular phones). One method of training such neural networks is a type of Deep Learning known as Federated Learning (FL), which trains machine learning (ML) models using large amounts of data while ensuring a user's privacy.

Deep learning refers to technology used to cluster or classify objects or data and is currently used in various technical fields to enable inferences according to classifications through a multilayered neural network.

Federated learning in of deep learning technologies refers to distributed machine learning technology and may implement co-modeling by exchanging an encrypted intermediate result of machine learning so that basic data and underlying data encryption (mixture) form is not disclosed on a user side that participates in federated learning.

In particular, FL techniques consist of a local training phase and a global aggregation phase. In the local training phase, each edge device trains its copy of the neural network with data sensed and used by the application. By performing the training on the edge device, the local data is not exposed or transmitted externally (such as to a remote coordinator or server), thereby ensuring privacy of the edge device user's data. Instead, only the local updates to the neural networks trained on the edge devices are transmitted to a coordinator, which aggregates the updates to generate a new global model. The global model can then be provided to other edge devices for use in the application.

Such federated learning has advantages in that it is possible to (i) train a machine learning model on an electronic device (e.g., a user terminal) and (ii) perform learning using personal data that is difficult to acquire from a server.

SUMMARY

Example embodiments may integrally manage a plurality of federated learning models mounted to a device based on a device state.

Example embodiments may manage a plurality of federated learning models to minimize resource consumption of a device without interfering with the use of a device while meeting requirements of each federated learning model.

According to an aspect of at least one example embodiment, there is provided a federated learning model management method performed by a computer device including at least one processor configured to execute computer-readable instructions included in a memory, the federated learning model management method including, by the at least one processor, monitoring state information of the computer device to which a plurality of federated learning models is incorporated; and performing learning scheduling on the plurality of federated learning models based on the state information and requirements for each model.

The monitoring may include monitoring a resource state related to model learning of the computer device as the state information.

The monitoring may include verifying requirements required for model learning for each model with respect to the plurality of federated learning models.

The performing may include determining a learning schedule for the plurality of federated learning models based on at least one state of a remaining battery level of the computer device, a charging status of the computer device, and a use status by a user.

The determining may include determining the learning schedule based on at least one of a learning cycle, a required resource, and required data for each federated learning model with respect to the plurality of federated learning models.

The determining may include determining the learning schedule when minimum learning data required for each federated learning model is determined with respect to the plurality of federated learning models.

The federated learning model management method may further include, by the at least one processor, training the plurality of federated learning models based on a result of the learning scheduling; and uploading a learning result for each federated learning model to a server with respect to the plurality of federated learning models.

The uploading may include uploading the learning result based on at least one of an upload cycle and an upload type required for each federated learning model.

The federated learning model management method may further include, by the at least one processor, updating each federated learning model with a latest version of a model with respect to the plurality of federated learning models.

The federated learning model management method may further include, by the at least one processor, verifying a preparation condition for model learning for each federated learning model with respect to the plurality of federated learning models and performing a learning preparation operation corresponding to the verified preparation condition.

According to an aspect of at least one example embodiment, there is provided a non-transitory computer-readable recording medium storing instructions that, when executed by a processor, cause the processor to computer-implement the federated learning model management method.

According to an aspect of at least one example embodiment, there is provided a computer device including at least one processor configured to execute computer-readable instructions included in a memory. The at least one processor is configured to perform a process of monitoring state information of the computer device to which a plurality of federated learning models is mounted; and a process of performing learning scheduling on the plurality of federated learning models based on the state information and requirements for each model.

BRIEF DESCRIPTION OF DRAWINGS

The above and/or other aspects will be more apparent by describing certain example embodiments, with reference to the accompanying drawings, in which:

FIGS. 3 and 4 illustrate examples of federated learning technology according to at least one example embodiment;

FIG. 6 is a flowchart illustrating an example of a method performed by a computer device according to at least one example embodiment;

Figure 1:
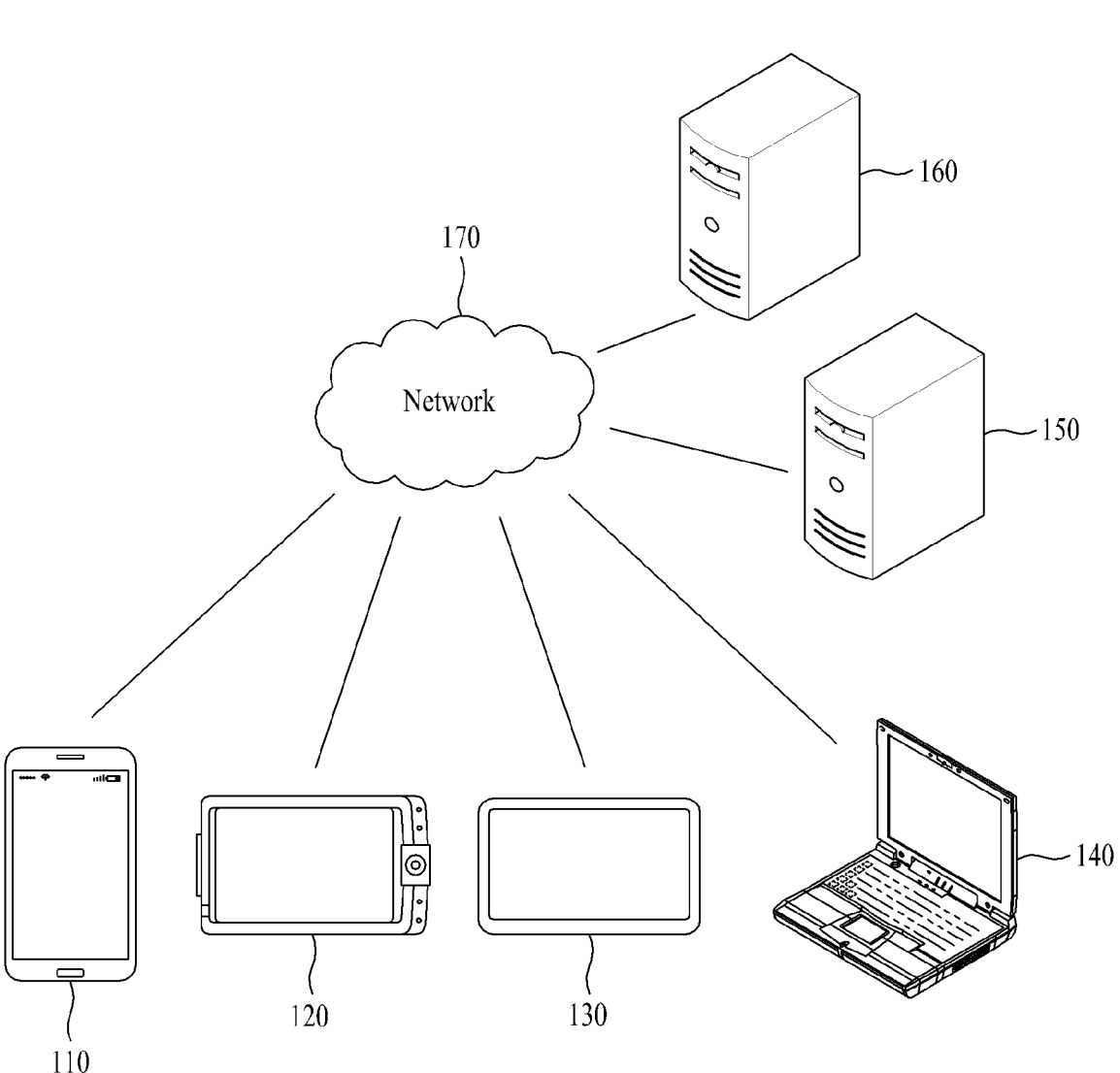
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flow-chart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for managing a federated learning model on a device.

The example embodiments including the disclosures set forth herein may integrally manage a plurality of federated learning models mounted to a device based on a device state of the device.

A federated learning model management system according to some example embodiments may be implemented by at least one computer device and a federated learning model management method according to some example embodiments may be performed by at least one computer device included in the federated learning model management system. Here, a computer program according to an example embodiment may be installed and executed on the computer device and the computer device may perform the federated learning model management method according to example embodiments under control of the executed computer program. The aforementioned computer program may be stored in a computer-readable recording medium to implement the federated learning model management method in conjunction with the computer device.

FIG. 1 illustrates an example of a network environment according to at least one example embodiment. The network environment may be set up as a neural network. A neural network may be based on a collection of connected units or nodes called artificial neurons, which loosely model the neurons in a biological brain. Each connection, like the synapses in a biological brain, may transmit a signal to other neurons. An may artificial neuron receive signals to process and may then signal other neurons connected to it. These signals at a connection may be real numbers, and the output of each neuron may be computed by some non-linear function of the sum of its inputs. These connections may be edges. Neurons and edges may have a weight that adjusts as learning proceeds. The weight may increase or decrease the strength of the signal at a connection. Neurons may have a threshold such that a signal may be sent only if the aggregate signal crosses that threshold. Neurons may be aggregated into layers. Different layers may perform different transformations on their inputs. Signals may travel from a first layer (e.g., an input layer), to a last layer (e.g., an output layer), through potential intermediate layers and may do so multiple times.

Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, or any other device capable of electronic computation. For example, although FIG. 1 illustrates a smartphone as the electronic device 110, the electronic device 110 used herein may refer to one of various types of physical computer devices capable of communicating with other electronic devices 120, 130, and 140, and/or the servers 150 and 160 over the network 170 via wireless or wired electronic communication.

The number and arrangement of servers 150, 160 and networks 170 shown in FIG. 1 are provided as an example. In practice, there may be additional servers 150, 160 and/or networks 170, fewer servers 150, 160 and/or networks 170, different servers 150, 160 and/or networks 170, or differently arranged servers 150, 160 and/or networks 170 than those shown in FIG. 1. Furthermore, two or more servers 150, 160 shown in FIG. 1 may be implemented within a single server 150, or a single server 150 shown in FIG. 1 may be implemented as multiple, distributed servers 150, 160. Additionally, or alternatively, a set of servers 150, 160 (e.g., one or more servers 150, 160) may perform one or more functions described as being performed by another set of servers 150, 160.

The type and arrangement of electronic communication scheme is not limited and may include, for example, a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, or any other electronic data, through communication with the plurality of electronic devices 110, 120, 130, and 140 over the network 170. For example, the server 150 may be a system that provides a service (e.g., a federated learning model management service) to the plurality of electronic devices 110, 120, 130, and 140 connected over the network 170.

Figure 2:
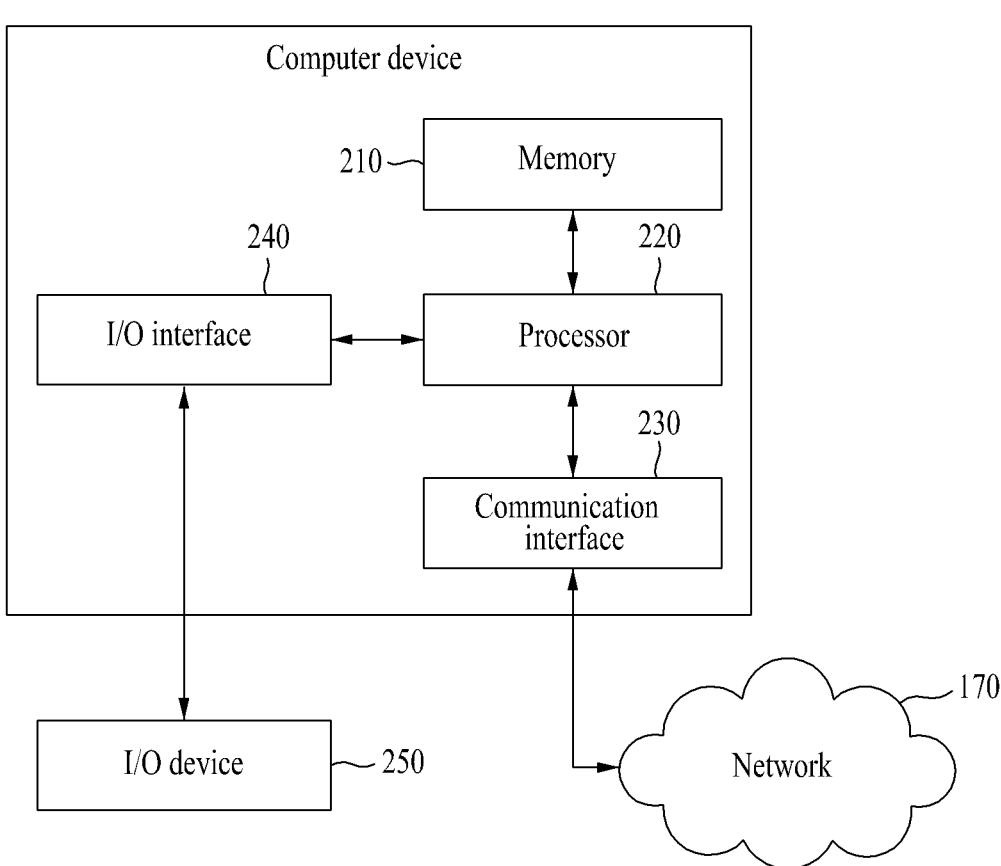
FIG. 2 is a diagram illustrating a configuration of an electronic device and a server according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be implemented in hardware, firmware, or a combination of hardware and software. The processor 220 may be at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 220 may include one or more processors capable of being programmed to perform a function.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

Additionally, or alternatively, hardwired circuitry may be used in place of or in combination with software instructions to perform one or more processes described herein. Thus, embodiments described herein are not limited to any specific combination of hardware circuitry and software.

The communication interface 230 may provide a function for communication between the communication apparatus 200 and another apparatus, for example, the aforementioned storage devices, through the network 170. For example, the processor 220 of the computer device 200 may deliver a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be delivered to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, or any other device configured to transmit an electronic signal to the computer device 200. For example, an output device may include a display, a speaker, or any other device configured to transmit an electronic signal from the computer device 200. As another example, the I/O interface 240 may be a device for interfacing with a device in which an input function and an output function are integrated into a single function, such as a touchscreen. The I/O device 250 may be configured as a single device with the computer device 200.

Also, according to other example embodiments, the computer device 200 may include a greater or smaller number of components than the number of components of FIG. 2. However, there is no need to clearly illustrate most conventional components. For example, the computer device 200 may be configured to include at least a portion of the I/O device 250 or may further include other components, such as a transceiver and a database.

Hereinafter, example embodiments of a method and an apparatus for managing a plurality of federated learning models mounted to a device are described.

Figure 3:
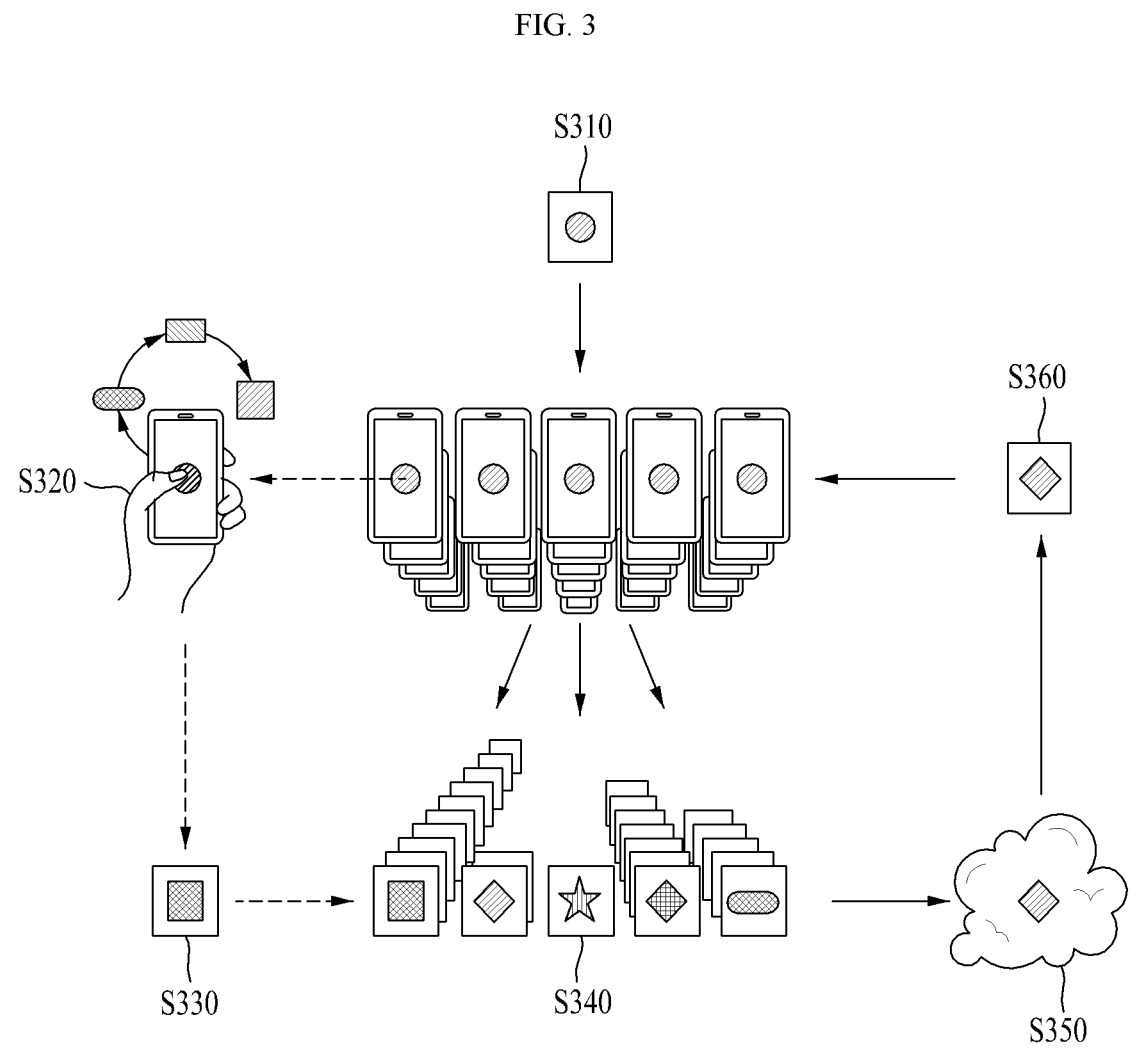
Figure 4:
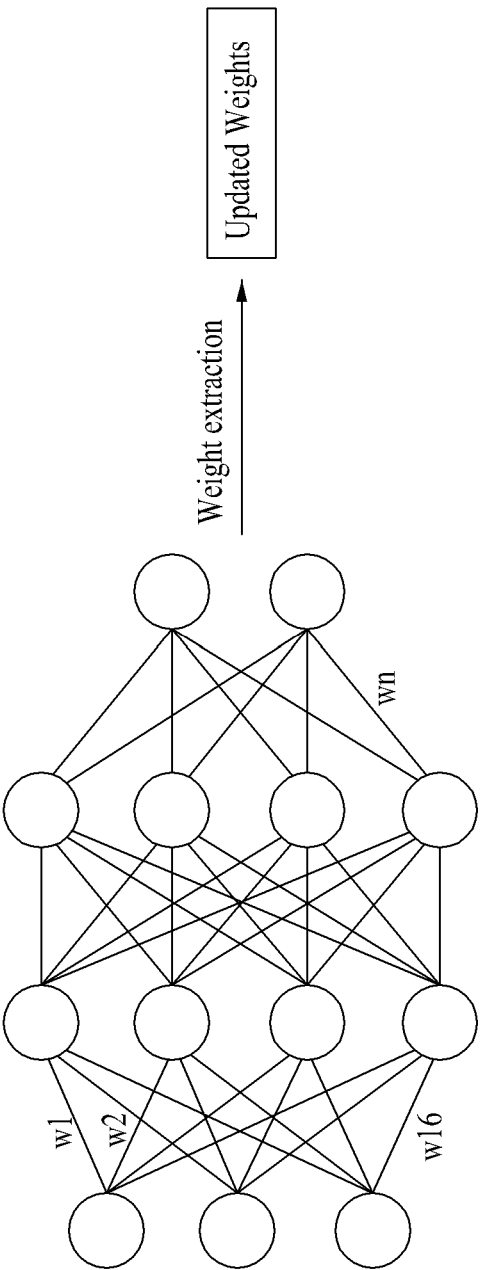

FIGS. 3 and 4 illustrate examples of federated learning technology according to at least one example embodiment.

In the case of applying federated learning, it is possible to train a model jointly while directly managing data in an individual device and there is no need to store data in the server 150 or a separate server (e.g., the server 160). Therefore, individual privacy protection may be guaranteed.

Referring to FIG. 3, all the electronic devices selected for federated learning download a prediction model corresponding to an initial model (see step S310). Each electronic device improves learning of the prediction model based on data in a device according to use of a user (see step S320). The electronic device may improve learning of the prediction model and then generate modifications according to the improvement as update data (see step S330). Prediction models of all the electronic devices may be trained by applying a different use environment and user characteristic for each device (see step S340). Update data of each electronic device may be transmitted to the server 150 and used to improve the corresponding prediction model (see step S350). The improved prediction model may be redistributed to each electronic device (see step S360). Each electronic device may develop and share the prediction model while repeating the process of retraining and improving the redistributed prediction model.

A service based on such federated learning has the following differences. Since the server 150 does not collect user data for model learning, personal information may not be exposed. Instead of data collected in an arbitrary environment, real-use data by the user in the electronic device is used for model learning. Also, since model learning individually occurs in a device of each user, a separate server for learning is not required (resulting in a lower costs and a reduction in computerized equipment). In addition, since weights corresponding to update data are collected without transmitting raw data of an individual to the server 150, exposure of user personal information may be prevented.

FIG. 4 illustrates an example of a weight that represents update data in a federated learning process. The term "weight" represents a set of variables learnable using a deep learning neural network. Update data in each electronic device to improve a prediction model may be generated in a form of a weight. The weight generated through the prediction model of each electronic device may be represented as, for example, $W=[w1, w2, \ldots, wn]$. The generated weight may be uploaded to the server 150 and used to improve the prediction model.

In an environment in which a plurality of federated learning models is incorporated into an electronic device, an environment for integrally managing the federated learning models in the electronic device and a variety of other operations (e.g., learning scheduling) are emerging.

First, the plurality of federated learning models each may be maintained and managed as a latest version of a particular model.

Second, since resources (e.g., minimum learning data amount, CPU capacity, RAM capacity, and storage space capacity associate with learning) differ between individual models, each model may be trained accordingly.

Third, a learning result may be updated with a different cycle and method for each federated learning model.

Fourth, in training the federated learning model, battery consumption of a device may be minimized as much as possible such that training does not interfere with the user in using the device.

To this end, the example embodiment may provide an efficient learning environment that is customized to requirements for each federated learning model based on a device state with respect to a plurality of federated learning models mounted to a device.

Figure 5:
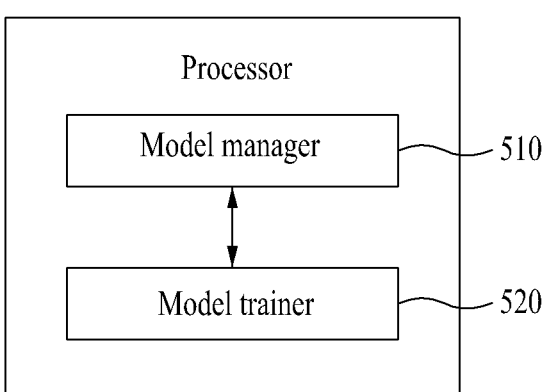
FIG. 5 is a diagram illustrating an example of a component includable by a processor of a computer device according to at least one example embodiment.

FIG. 5 is a diagram illustrating an example of a component includable by a processor of a computer device according to at least one example embodiment, and FIG. 6 is a flowchart illustrating an example of a federated learning model management method performed by a computer device according to at least one example embodiment.

A computer-implemented federated learning model management system may be configured in the computer device 200 according to the example embodiment. For example, the federated learning model management system may be implemented in an independently operating program form or may be configured in an in-app form of a specific application to be operable on the specific application.

Referring to FIG. 5, the processor 220 of the computer device 200 may include a model manager 510 and a model trainer 520 as components to perform the following federated learning model management method. Depending on example embodiments, the components of the processor 220 may be selectively included in or excluded from the processor 220. Also, depending on example embodiments, the components of the processor 220 may be separated or merged for functional representations of the processor 220.

The processor 220 and the components of the processor 220 may control the computer device 200 to perform operations included in the following federated learning model management method. For example, the processor 220 and the components of the processor 220 may be implemented to execute an instruction according to a code of at least one program and a code of an operating system (OS) included in the memory 210.

Here, the components of the processor 220 may be representations of different functions performed by the processor 220 according to an instruction provided from a program code stored in the computer device 200. For example, the model manager 510 may be used as a functional expression of the processor 220 that controls the computer device 200 according to the instruction such that the computer device 200 may provide an integrated management environment for the plurality of federated learning models mounted to the computer device 200.

The processor 220 may read a necessary instruction from the memory 210 to which instructions related to control of the computer device 200 are loaded. In this case, the read instruction may include an instruction for controlling the processor 220 to perform the following federated learning model management method.

Operations included in the following federated learning model management method may be performed in an order different from that which is illustrated in FIG. 6. Additionally, a portion of operations may be omitted, or an additional process may be further included.

Referring to FIG. 6, in operation S610, the model manager 510 may perform learning scheduling into consideration of requirements of each federated learning model and an idle status of a corresponding device with respect to a plurality of federated learning models incorporated into the device.

The model manager 510 may verify state information that includes a current situation and specifications of the device corresponding to the computer device 200. For example, the state information of the device may include information on resources related to a learning environment of a federated learning model, for example, a memory, CPU specifications, load, a free storage space, a network availability status, type, a throughput, a battery status, and other components/characteristics.

The model manager 510 may verify requirements related to model learning for each federated learning model with respect to the plurality of federated learning models incorporated into the device. The model manager 510 may verify, for example, a model storage size, resource (e.g., CPU usage, memory), a minimum learning time, input data requirements (e.g., a data type, a number of data) for learning as requirements for model learning.

The model manager 510 may determine a learning schedule according to requirements for each model based on a device state with respect to the plurality of federated learning models. In some arrangements, the model manager 510 may schedule a learning environment that does not interfere with the user in using the corresponding device while minimizing battery consumption of the device. For example, the model manager 510 may provide a learning environment for the plurality of federated learning models when a remaining battery level of the device is 50% or more, when the device is being charged, and when the user is not using the device. Also, the model manager 510 may determine the learning schedule using a learning cycle (e.g., once a day, at most once a day) required for each federated learning model. Also, the model manager 510 may determine the learning schedule according to resources required for learning for each federated learning model. Also, the model manager 510 may determine the learning schedule based on input data requirements required for learning for each federated learning model.

The model manager 510 may set learning priority into consideration of a device state and requirements for each model with respect to the plurality of federated learning models and may determine a schedule that sequentially trains models one by one or simultaneously trains at least two models.

In operation S620, the model trainer 520 may train the plurality of federated learning models mounted to the device based on a result of learning scheduling performed in operation S610. The model trainer 520 may sequentially train models or may simultaneously train at least two models based on the learning schedule that is determined based on the device state and the requirements for each model.

The model manager 510 may manage a learning result upload cycle required for each federated learning model. The model manager 510 may upload the learning result of the federated learning model to at least one storage device (e.g., the server 150) in various forms suitable for requirements of each model. A method of uploading the entire model as the learning result, a method of uploading only model modifications (e.g., differential, gradient), and an uploading method in a form of a model in which a noise value is added for personal information protection may be applied according to the federated learning model.

In providing the integrated management environment for the plurality of federated learning models, the model manager 510 may manage versions of all the federated learning models mounted to the device in addition to uploading the learning scheduling and learning results. The model manager 510 may maintain and manage the federated learning models mounted to the device as a latest version of a model through communication with the server 150.

Figure 7:
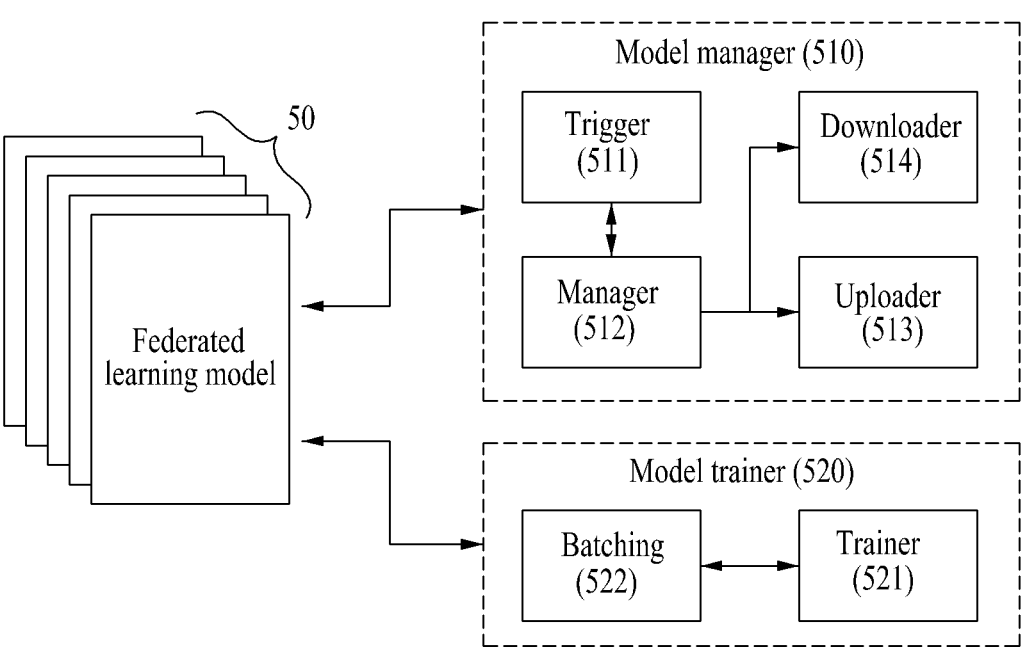
FIG. 7 illustrates an example of an architecture of a federated learning model management system according to at least one example embodiment.

FIG. 7 illustrates an example of an architecture of a federated learning model management system according to at least one example embodiment.

Referring to FIG. 7, the model manager 510 may include a trigger 511, a manager 512, an uploader 513, and a downloader 514, and the model trainer 520 may include a trainer 521 and a batching 522.

The trigger 511 may be configured to monitor an idle status, a CPU, a memory, a network, and a battery as a device state. The trigger 511 may call a trigger signal registered as a setting value by the manager 512 when a predetermined (or, alternatively, desired) condition of the corresponding trigger 511 is observed. Here, the trigger 511 may provide a predetermined (or, alternatively, desired) time interval or a minimum call interval for the trigger signal.

The manager 512 may provide an integrated management environment for a plurality of federated learning models 50 mounted to a device and may manage the overall federated learning and may be in charge of the overall function for integrated management and ON/OFF of an individual learning model. The manager 512 may control model learning to be executed according to a learning environment for the federated learning models 50 through the trigger 511. Here, the manager 512 may determine learning order based on requirements (e.g., a model storage size, resources (e.g., CPU usage, memory), a minimum learning time, and minimum learning data) of each model with respect to the plurality of federated learning models 50 mounted to the device. The manager 512 may control download to a latest version for version management of each federated learning model 50 and may control the learning result of each federated learning model 50 to be uploaded according to a criterion (e.g., an upload cycle and an upload type) for a corresponding model.

The uploader 513 may be configured to upload the learning result of the federated learning model 50 to the server 150 in a form of the entire model or model modifications (e.g., differential, gradient) under control of the manager 512.

The downloader 514 may be configured to download the federated learning model 50 of the latest version from the server 150 under control of the manager 512.

The trainer 521 may be configured to train the federated learning model 50 using the federated learning model 50 and a record that is learning data and to update the federated learning model 50.

When there is a large amount of record data used for model learning, the batching 522 may be configured to generate the record data into a bundle to simultaneously perform learning several times at a time.

A federated learning module that includes the federated learning model 50 may be applied to various services, such as photo recognition, word recommendation, sticker recommendation, and speech recognition, and to this end, may include a collector configured to collect record data used for learning, a storage configured to store the record data, and a reasoner configured to provide inference information (a prediction result, a classification result, etc.) using the federated learning model 50.

Figure 8:
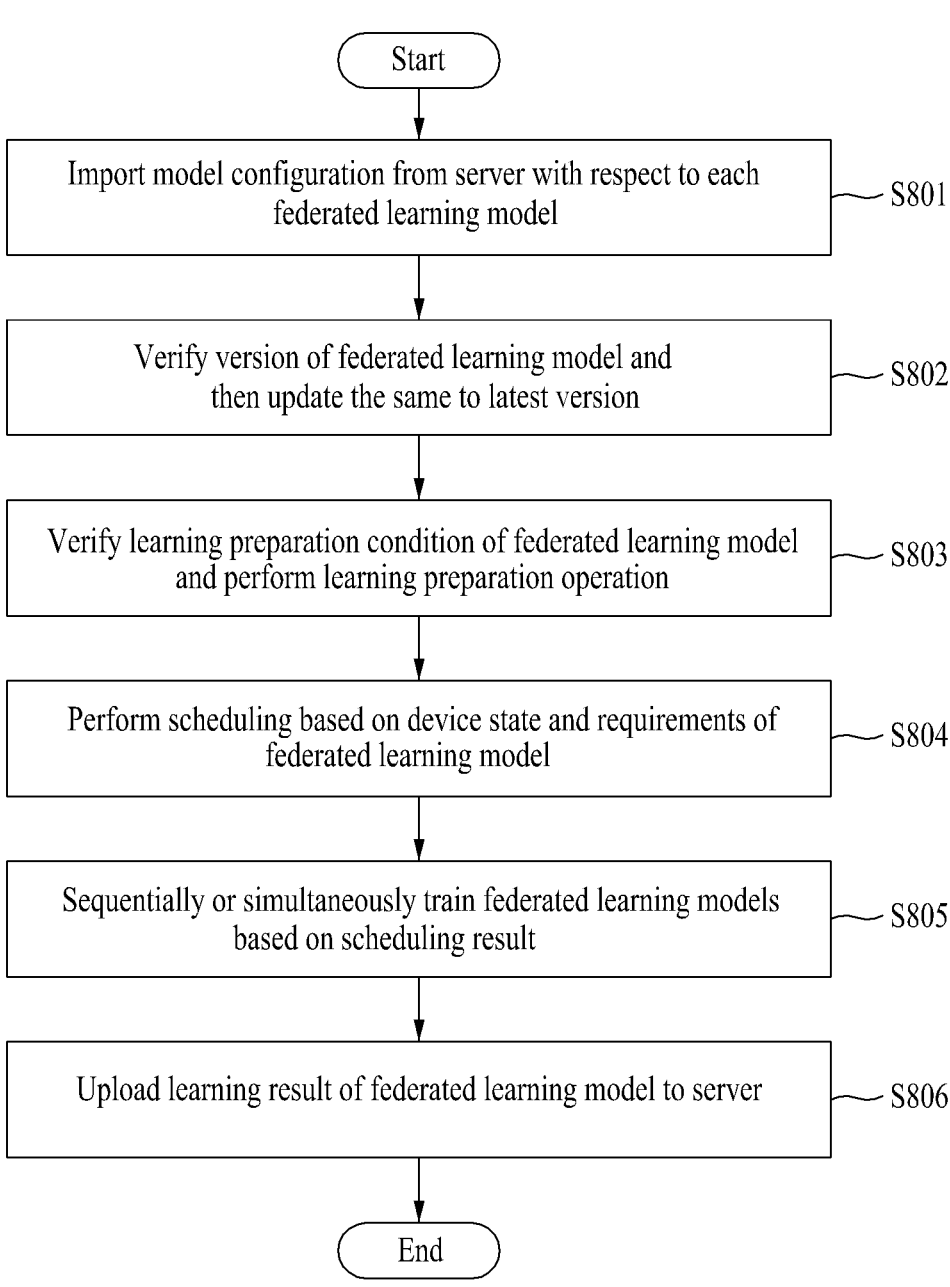
FIG. 8 is a flowchart illustrating an example of a detailed process of a federated learning model management method according to at least one example embodiment.

FIG. 8 is a flowchart illustrating an example of a detailed process of a federated learning model management method according to at least one example embodiment.

The manager 512 may determine a use status (e.g., enable/disable) of the federated learning model 50 by checking a set service configuration through the server 150 at a system startup time, such as an application execution or a device booting.

In the case of not using the federated learning model 50 according to the service configuration, the manager 512 may switch the trigger 511 to an inactive state, that is, a disabled state, and may initialize a set value registered to the trigger 511.

Meanwhile, in the case of using at least one federated learning model 50 among the plurality of federated learning models 50 incorporated into a device according to the service configuration, the manager 512 may switch the trigger 511 to an active state, that is, an enabled state. Here, the manager 512 may set, to the trigger 511, a set value (e.g., a battery state, a charge status, an Internet connection status) for setting at least one federated learning model 50 to be used at the service as a management target.

Referring to FIG. 8, in operation S801, the manager 512 may import a model configuration from the server 150 with respect to each federated learning model 50 set to be managed. Since model requirements may differ for each model, the model configuration may be imported from the server 150 through settings according to a cycle required by each federated learning model 50.

In operation S802, the manager 512 may verify a model version based on the model configuration for each federated learning model 50 and then may update the same to a latest version.

The manager 512 may download and install the latest version of the federated learning model 50 from the server 150 through the downloader 514. Here, the manager 512 may delete record data or an intermediate learning result collected for the federated learning model 50 of a previous version and may newly register settings for the latest version to the trigger 511.

In operation S803, the manager 512 may check whether the corresponding model is in a learnable state based on the model configuration for each federated learning model 50. For example, the manager 512 may verify a preparation condition for learning of each federated learning model 50 and may perform a learning preparation operation for the corresponding condition.

The learning preparation operation may include an operation of downloading a function associated with learning, an operation of decompressing a model, and an operation of preprocessing record data, prior to model learning. Each federated learning model 50 entrusts the manager 512 with a preparation process in a kind of task form, prior to model learning. For example, the manager 512 may perform a task by verifying a preprocessing status of record data used for model learning or a clustering version prior to model learning. Since model requirements may differ for each model, the learning preparation operation of each federated learning model 50 may be performed according to settings suitable for requirements of a corresponding model.

The manager 512 may verify input data requirements (e.g., a data type, a number of data, etc.) for learning based on the model configuration for each federated learning model 50. That is, when minimum learning data required for learning is collected for each federated learning model 50, the manager 512 may determine that preparation for model learning is completed.

In operation S804, the manager 512 may perform learning scheduling based on a device state and requirements of each federated learning model 50 with respect to the federated learning model 50 of which preparation for model learning is completed.

The manager 512 may determine a learning schedule with respect to the plurality of federated learning models 50 by setting learning order of models according to the device state and requirements of each federated learning model 50.

In operation S805, the manager 512 may train the plurality of federated learning models 50 through the trainer 521 based on a scheduling result. The manager 512 may sequentially train the federated learning models 50 one by one according to the learning schedule or may simultaneously train at least two federated learning models 50.

When learning of the federated learning model 50 is completed, the manager 512 may delete record data used for model learning.

In operation S806, the manager 512 may upload the learning result of each model to the server 150 in a form of the entire trained model or model modifications through the uploader 513 with respect to the federated learning model 50 of which model learning is completed.

As described above, according to some example embodiments, it is possible to efficiently integrate and manage a plurality of federated learning models mounted to a single device by providing a learning environment that meets requirements of each model into consideration of a device state to minimize resource consumption of a device without interfering with a user in using the device.

The apparatuses described above may be implemented using hardware components, software components, and/or a combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may include, alone or in combination with program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A federated learning model management method performed by a computer device comprising at least one processor configured to execute computer-readable instructions included in a memory, the federated learning model management method comprising:

monitoring, by the at least one processor, state information of the computer device to which a plurality of federated learning models is mounted, the plurality of federated learning models being different from each other;

automatically performing learning scheduling, by the at least one processor, on the plurality of federated learning models based on the state information and requirements for each model;

training, by the at least one processor, the plurality of federated learning models based on a result of the learning scheduling; and updating, by the at least one processor, the plurality of federated learning models based on a learning result of the training for each federated learning model, wherein the computer device is a single computer device, and wherein the performing comprises determining a learning schedule for the plurality of federated learning models based on at least one state of a remaining battery level of the computer device, a charging status of the computer device, and a use status by a user.

2. The federated learning model management method of claim 1, wherein the monitoring comprises monitoring a resource state related to model learning of the computer device as the state information.

3. The federated learning model management method of claim 1, wherein the monitoring comprises verifying requirements required for model learning for each model with respect to the plurality of federated learning models.

4. The federated learning model management method of claim 1, wherein the determining comprises determining the learning schedule based on at least one of a learning cycle, a required resource, and required data for each federated learning model with respect to the plurality of federated learning models.

17 18

5. The federated learning model management method of claim 1, wherein the determining comprises determining the learning schedule when minimum learning data required for each federated learning model is determined with respect to the plurality of federated learning models.

6. The federated learning model management method of claim 1, further comprising:

uploading, by the at least one processor, the learning result for each federated learning model to a server with respect to the plurality of federated learning models.

7. The federated learning model management method of claim 6, wherein the uploading comprises uploading the learning result based on at least one of an upload cycle and an upload type required for each federated learning model.

8. The federated learning model management method of claim 1, further comprising:

updating, by the at least one processor, each federated learning model with a latest version the respective model with respect to the plurality of federated learning models.

9. The federated learning model management method of claim 1, further comprising:

verifying, by the at least one processor, a preparation condition for model learning for each federated learning model with respect to the plurality of federated learning models and performing a learning preparation operation corresponding to the verified preparation condition.

10. A non-transitory computer-readable recording medium storing instructions that, when executed by a processor, cause the processor to computer-implement a federated learning model management method of:

monitoring, by the processor, state information of a computer device to which a plurality of federated learning models is mounted;

automatically performing learning scheduling, by the processor, on the plurality of federated learning models based on the state information and requirements for each model;

training, by the processor, the plurality of federated learning models based on a result of the learning scheduling; and updating, by the processor, the plurality of federated learning models based on a learning result of the training for each federated learning model, wherein the computer device is a single computer device, and wherein the performing comprises determining a learning schedule for the plurality of federated learning models based on at least one state of a remaining battery level of the computer device, a charging status of the computer device, and a use status by a user.

11. A computer device comprising:

at least one processor configured to execute computer-readable instructions included in a memory, wherein the at least one processor is configured to perform:

a process of monitoring state information of the computer device to which a plurality of federated learning models is mounted;

a process of automatically performing learning scheduling on the plurality of federated learning models based on the state information and requirements for each model;

a process of training the plurality of federated learning models based on a result of the learning scheduling; and a process of updating the plurality of federated learning models based on a learning result of the training for each federated learning model, and wherein the computer device is a single computer device, and wherein the at least one processor is configured to determine a learning schedule for the plurality of federated learning models based on at least one state of a remaining battery level of the computer device, a charging status of the computer device, and a use status by a user.

12. The computer device of claim 11, wherein the at least one processor is configured to monitor a resource state related to model learning of the computer device as the state information, and to verify requirements required for model learning for each model with respect to the plurality of federated learning models.

13. The computer device of claim 11, wherein the at least one processor is configured to determine the learning schedule based on at least one of a learning cycle, a required resource, and required data for each federated learning model with respect to the plurality of federated learning models.

14. The computer device of claim 11, wherein the at least one processor is configured to determine the learning schedule when minimum learning data required for each federated learning model is determined with respect to the plurality of federated learning models.

15. The computer device of claim 11, wherein the at least one processor is configured to upload the learning result for each federated learning model to a server with respect to the plurality of federated learning models.

16. The computer device of claim 15, wherein the at least one processor is configured to upload the learning result based on at least one of an upload cycle and an upload type required for each federated learning model.

17. The computer device of claim 11, wherein the at least one processor is configured to update each federated learning model with a latest version of a model with respect to the plurality of federated learning models.

18. The computer device of claim 11, wherein the at least one processor is configured to verify a preparation condition for model learning for each federated learning model with respect to the plurality of federated learning models and to perform a learning preparation operation corresponding to the verified preparation condition.

* * * * *